US008380014B2

(12) United States Patent
Ito et al.

(10) Patent No.: US 8,380,014 B2
(45) Date of Patent: Feb. 19, 2013

(54) BAR-CODE TICKET PROCESSING APPARATUS AND METHOD OF CONTROLLING BAR-CODE TICKET PROCESSING APPARATUS

(75) Inventors: Osamu Ito, Kawaguchi (JP); Hirofumi Ozaki, Tokyo-To (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 344 days.

(21) Appl. No.: 12/735,024

(22) PCT Filed: Dec. 10, 2007

(86) PCT No.: PCT/JP2007/073800
§ 371 (c)(1),
(2), (4) Date: Jun. 10, 2010

(87) PCT Pub. No.: WO2009/075019
PCT Pub. Date: Jun. 18, 2009

(65) Prior Publication Data
US 2010/0296753 A1 Nov. 25, 2010

(51) Int. Cl.
*G06K 7/10* (2006.01)
(52) U.S. Cl. ............... 382/321; 382/183; 235/462.25; 235/375; 235/454
(58) Field of Classification Search ............. 382/183, 382/321; 235/462.25, 375, 454
See application file for complete search history.

(56) References Cited

FOREIGN PATENT DOCUMENTS
| JP | 07-085253 | 3/1995 |
| JP | 2001-282962 | 10/2001 |
| JP | 2005-288346 | 10/2005 |
| JP | 2006-146774 | 6/2006 |

OTHER PUBLICATIONS

Ishibashi, the machin English translation of JP2006-146774, 2006.*
Yamamoto et al, the machin English translation of JP07-085253, 1995.*
Asai et al, the machin English translation of JP2001-282962, 2001.*

* cited by examiner

*Primary Examiner* — Claire X Wang
*Assistant Examiner* — Ruiping Li
(74) *Attorney, Agent, or Firm* — Renner, Kenner, Greive, Bobak, Taylor & Weber (57) ABSTRACT

A burden of an operation of manually inputting identification information of an error bar-code ticket by using an external device can be reduced, and both image information and identification information of the error bar-code ticket can be transmitted to the external device. A bar-code ticket processing apparatus to be connected to an external device, the bar-code ticket processing apparatus includes: a taking unit configured to take thereinto a bar-code ticket; an image-information reading unit configured to read image information of the bar-code ticket taken by the taking unit; an identification-information reading unit configured to read identification information of the bar-code ticket taken by the taking unit; a control unit configured to judge, when the identification-information reading unit fails in reading of the identification information of the bar-code ticket, the bar-code ticket as an error bar-code ticket; an input unit configured to receive a manual input of the identification information of the bar-code ticket judged as the error bar-code ticket by the control unit; and a data transmitting unit configured to transmit, to the external device, the image information read by the image-information reading unit and the identification information received by the input unit.

20 Claims, 10 Drawing Sheets

BAR-CODE TICKET PROCESSING APPARATUS AND METHOD OF CONTROLLING BAR-CODE TICKET PROCESSING APPARATUS

FIELD OF THE INVENTION

The present invention relates to a bar-bode ticket processing apparatus and a method of controlling the apparatus. In particular, the present invention relates to a bar-code ticket processing apparatus to be connected to an external device, and a method of controlling the apparatus.

BACKGROUND ART

In casino halls, an amusement machine (e.g., a slot machine) has been recently equipped with an apparatus for taking thereinto banknotes or bar-code tickets. When a banknote is taken thereinto, an accounting operation is performed by a banknote processing device. Meanwhile, when a bar-code ticket is taken thereinto, an accounting operation is performed by a bar-code ticket processing apparatus. Specifically, in the accounting operation of a bar-code ticket, it is sometimes required to manage, for a predetermined period of time, the bar-code ticket itself used by a player or the like or image information thereof.

U.S. Pat. No. 7,201,320 discloses a bar-code ticket processing apparatus that reads image information of a bar-code ticket and identification information thereof (e.g., characters (validation number) indicating the contents of the bar-code), and transmits the image information and the identification information to an external device (terminal device) for managing the image information and the identification information.

However, the bar-code ticket processing apparatus disclosed in U.S. Pat. No. 7,201,320 transmits all the image information of the bar-code tickets taken therein to the external device, regardless of consequence (success or fail) of reading of the identification information. Thus, the external device stores both the image information of bar-code tickets whose identification information were successfully read, and the image information of other bar-code tickets whose identification information were erroneously read (hereinafter referred to as "error bar-code ticket"). Thus, after the operation of the bar-code ticket processing apparatus has been finished, it is necessary to manually input the identification information of the error bar-code ticket, by using the external device, i.e., a burden of the operation by using the external device is increased. Especially, when the image information and the identification information are transmitted from a plurality of bar-code ticket processing apparatuses, the burden of the operation by using the external device is significantly increased.

On the other hand, there has been conventionally known another type of bar-code ticket processing apparatus that transmits the image information and the identification information to the external device, only when the identification information was successfully read.

However, since this type of bar-code ticket processing apparatus is disadvantageous in that, when the identification information fails to be read, the read image information is also not transmitted, so that neither image information nor identification information of such an error bar-code ticket cannot be transmitted to the external device.

DISCLOSURE OF THE INVENTION

The present invention has been made in view of the above circumstances. The object of the present invention is to reduce the burden of the operation of manually inputting the identification information of an error bar-code ticket by using an external device, and to transmit both the image information and the identification information of an error bar-code ticket to an external device.

According to a first embodiment of the present invention, there is provided a bar-code ticket processing apparatus to be connected to an external device, the bar-code ticket processing apparatus including: a taking unit configured to take thereinto a bar-code ticket; an image-information reading unit configured to read image information of the bar-code ticket taken by the taking unit; an identification-information reading unit configured to read identification information of the bar-code ticket taken by the taking unit; a control unit configured to judge, when the identification-information reading unit fails in reading of the identification information of the bar-code ticket, the bar-code ticket as an error bar-code ticket; an input unit configured to receive a manual input of the identification information of the bar-code ticket judged as the error bar-code ticket by the control unit; and a data transmitting unit configured to transmit, to the external device, the image information read by the image-information reading unit and the identification information received by the input unit.

According to a second embodiment of the present invention, there is provided the bar-code ticket processing apparatus of the first embodiment wherein: the identification-information reading unit includes a bar-code reader configured to read a bar-code of the bar-code ticket taken by the taking unit; and when the bar-code reader fails in reading of the bar-code of the bar-code ticket, the control unit is configured to judge the bar-code ticket as the error bar-code ticket.

According to a third embodiment of the present invention, there is provided the bar-code ticket processing apparatus of the first embodiment wherein: the identification-information reading unit includes an OCR configured to read characteristic information printed on the bar-code ticket from the image information of the bar-code ticket read by the image-information reading unit; and when the OCR fails in reading of the characteristic information printed on the bar-code ticket, the control unit is configured to judge the bar-code ticket as the error bar-code ticket.

According to a fourth embodiment of the present invention, there is provided the bar-code ticket processing apparatus of the third embodiment wherein when the OCR fails in reading of a validation number corresponding to the bar-code, the control unit is configured to judge the bar-code ticket as the error bar-code ticket.

According to a fifth embodiment of the present invention, there is provided the bar-code ticket processing apparatus of the third embodiment wherein, when the OCR fails in reading of a sum of money or a shop name printed on the bar-code ticket, the control unit is configured to judge the bar-code ticket as the error bar-code ticket.

According to a sixth embodiment of the present invention, there is provided the bar-code ticket processing apparatus of the first embodiment that is further including a transportation unit configured to transport, when the bar-code ticket is judged as the error bar-code ticket by the control unit, the error bar-code ticket to the reject unit.

According to a seventh embodiment of the present invention, there is provided the bar-code ticket processing apparatus of the first embodiment wherein: the taking unit is configured to take thereinto error bar-code tickets one by one; and when the image information of the error bar-code ticket read by the image-information reading unit and the identification information of the error bar-code ticket received by the input unit are transmitted by the data transmitting unit to the external device, the taking unit is configured to take a next error bar-code ticket.

According to an eighth embodiment of the present invention, there is provided the bar-code ticket processing apparatus of the first embodiment wherein, when the bar-code ticket is judged as the error bar-code ticket by the control unit, the taking unit is configured to interrupt the taking operation.

According to a ninth embodiment of the present invention, there is provided the bar-code ticket processing apparatus of the eighth embodiment wherein: the input unit is configured to receive a manual input of the identification information of the error bar-code ticket, after the taking operation has been interrupted; and when the identification information of the error bar-code ticket is received by the input unit, the taking unit restarts the taking operation.

According to a tenth embodiment of the present invention, there is provided the bar-code ticket processing apparatus of the first embodiment that is further including a display unit configured to display the image information of the bar-code ticket judged as the error bar-code ticket by the control unit.

According to an eleventh embodiment of the present invention, there is provided a method of controlling a bar-code ticket processing apparatus to be connected to an external device, the method including: taking a bar-code ticket; reading image information of the bar-code ticket taken in the taking of the bar-code ticket; reading identification information of the bar-code ticket taken in the taking of the bar-code; judging, when the reading of the identification information of the bar-code ticket fails in the reading of the identification information, the bar-code ticket as an error bar-code ticket; receiving a manual input of the identification information of the bar-code ticket judged as the error bar-code ticket in the judging of the bar-code ticket; and transmitting the image information read in the reading of the image information and the identification information received by the receiving of the identification information to the external device.

According to a twelfth embodiment of the present invention, there is provided the method of controlling a bar-code ticket processing apparatus of the eleventh embodiment wherein: in the reading of the identification information, a bar-code of the bar-code ticket taken in the taking of the bar-code is read; and in the judging of the bar-code ticket, when the reading of the bar-code of the bar-code ticket fails in the reading of the identification information, the bar-code ticket is judged as the error bar-code ticket.

According to a thirteenth embodiment of the present invention, there is provided the method of controlling a bar-code ticket processing apparatus of the eleventh embodiment wherein: in the reading of the identification information, characteristic information printed on the bar-code ticket is read from the image information of the bar-code ticket read in the reading of the image information; and in the judging of the bar-code ticket, when the reading of the characteristic information printed on the bar-code ticket fails in the reading of the identification information, the bar-code ticket is judged as the error bar-code ticket.

According to a fourteenth embodiment of the present invention, there is provided the method of controlling a bar-code ticket processing apparatus of the thirteenth embodiment wherein, in the judging of the bar-code ticket, when the reading of a validation number corresponding to the bar-code fails in the reading of the identification information, the bar-code ticket is judged as the error bar-code ticket.

According to a fifteenth embodiment of the present invention, there is provided the method of controlling a bar-code ticket processing apparatus of the thirteenth embodiment wherein, in the judging of the bar-code ticket, when the reading of a sum of money or a shop name printed on the bar-code ticket fails in the reading of the identification information, the bar-code ticket is judged as the error bar-code ticket.

According to a sixteenth embodiment of the present invention, there is provided the method of controlling a bar-code ticket processing apparatus of the eleventh embodiment that is further including transporting, when the bar-code ticket is judged as the error bar-code ticket in the judging of the bar-code ticket, the error bar-code ticket to a reject unit.

According to a seventeenth embodiment of the present invention, there is provided the method of controlling a bar-code ticket processing apparatus of the eleventh embodiment wherein: in the taking of the bar-code ticket, error bar-code tickets are taken one by one; and when the image information of the error bar-code ticket read in the reading of the image information and the identification information of the error bar-code ticket received by the input unit are transported to the external device in the transmitting of the data, a next error bar-code ticket is taken in the taking of the bar-code ticket.

According to an eighteenth embodiment of the present invention, there is provided the method of controlling a bar-code ticket processing apparatus of the eleventh embodiment wherein, in the taking of the bar-code ticket, when the bar-code ticket is judged as the error bar-code ticket in the judging of the bar-code ticket, the taking operation is interrupted.

According to a nineteenth embodiment of the present invention, there is provided the method of controlling a bar-code ticket processing apparatus of the eighteenth embodiment wherein: in the receiving of the manual input, a manual input of the identification information of the error bar-code ticket is received after the taking operation has been interrupted; and in the taking of the bar-code ticket, when the identification information of the error bar-code ticket is received in the inputting of the identification information, the taking operation is restarted.

In a twentieth embodiment of the present invention, there is provided the method of controlling a bar-code ticket processing apparatus of the eleventh embodiment that is further including displaying the image information of the bar-code ticket judged as the error bar-code ticket in the judging of the bar-code ticket.

BEST MODE FOR CARRYING OUT THE INVENTION

Herebelow, examples of the present invention will be described with reference to the drawings. The following examples are shown by way of example, and do not limit the scope of the present invention.

Example 1

Example 1 of the present invention will be described at first. In example 1 of the present invention, in an error bar-code ticket process that is performed after a bar-code ticket process has been finished, image information of an error bar-code ticket is read and a manual input of identification information thereof is received.

Figure 1:
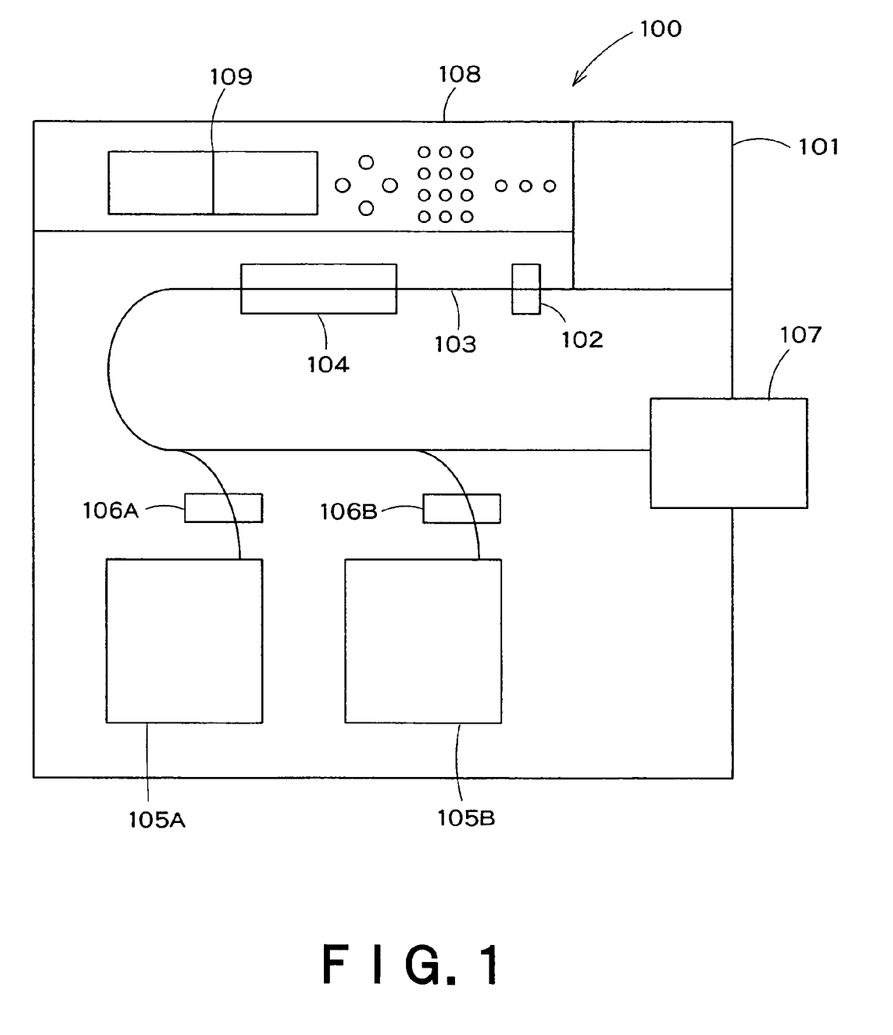
FIG. 1 is a front view showing the structure of a bar-code ticket processing apparatus 100 in Example 1 of the present invention.

FIG. 1 is a front view showing the structure of a bar-code ticket processing apparatus 100 in Example 1 of the present invention.

The bar-code ticket processing apparatus 100 in Example of the present invention includes a taking unit 101, a transportation state detecting unit 102, a transportation unit 103, a reading unit 104, a first collecting unit 105A, a second collecting unit 105B, a first counter 106A, a second counter 106B, a reject unit 107, an input unit 108, and a display unit 109. The respective units 101 to 109 are operated based on control signals outputted from a control unit 110 which is described below.

The taking unit 101 is configured to take thereinto bar-code tickets one by one from a batch (bundle) of bar-code tickets placed thereon.

The transportation state detecting unit 102 is a sensor configured to detect a transportation state of the bar-code tickets taken by the taking unit 101. Upon detection of an abnormal transportation, the transportation state detecting unit 102 is configured to output a abnormal-transportation signal to the control unit 110 described below. For example, when the transportation state detecting unit 102 detects a state in which a certain bar-code ticket taken by the taking unit 101 is skewed (skewed state), another state in which bar-code tickets are taken without any predetermined intervals therebetween (chained state), or another state in which bar-code tickets are taken in an overlapped manner (overlapped state), the transportation state detecting unit 102 outputs a abnormal-transportation signal to the control unit 110.

The transportation unit 103 is a transportation mechanism configured to transport the bar-code tickets taken by the taking unit 101 to the first collecting unit 105A, the second collecting unit 105B, or the reject unit 107. In FIG. 1, the transportation unit 103 includes a transportation path of a U-shape that is laterally arranged, a plurality of transportation belts, a plurality of transportation rollers, and a branching mechanism formed of branching claws or the like.

The reading unit 104 is disposed on a downstream side of the transportation state detecting unit 102. The reading unit 104 is configured to read image information and identification information (validation number) of a bar-code ticket that has been transported by the transportation unit 103. In Example 1 of the present invention, the reading unit 104 may be arranged on an upstream side of the transportation state detecting unit 102, or may be arranged integrally with the transportation state detecting unit 102.

The first and second collecting units 105A and 105B respectively have stackers in which the bar-code tickets, which have been transported by the transportation unit 103, can be collected. The respective stackers of the first and second collecting units 105A and 105B have openings opened to the same direction, and display panels for displaying counted results by the first and second counters 106A and 106B.

The first and second counters 106A and 106B are respectively configured to count the number of bar-code tickets collected in the first and second collecting units 105A and 105B, and to output the counted results to the control unit 110 and the display panels of the first and second collecting units 105A and 105B.

The reject unit 107 is located at a position nearer to the taking unit 101 than the first and second collecting units 105A and 105B. Preferably, the reject unit 107 is located below the taking unit 101 and on a terminal end of the U-shaped transportation belt. The reject unit 107 is provided with openings opened in plural directions including a direction of the taking unit 101, and with movable stoppers that prevents the collected bar-code tickets from jumping out from the openings. The maximum number of bar-code tickets to be collected in the reject unit 107 is smaller than the maximum numbers thereof to be collected in the first and second collecting unit 105A and 105B.

The input unit 108 has a plurality of input keys which can be manually operated by an operator. When one of the input keys is pushed down by an operator, the input unit 108 outputs a signal indicating the pressed input key to the control unit 110.

The display unit 109 is composed of two liquid-crystal display panels for displaying a predetermined image. The display unit 109 is configured to suitably display image data outputted by the control unit 110 on the two liquid-crystal display panels.

Figure 2:
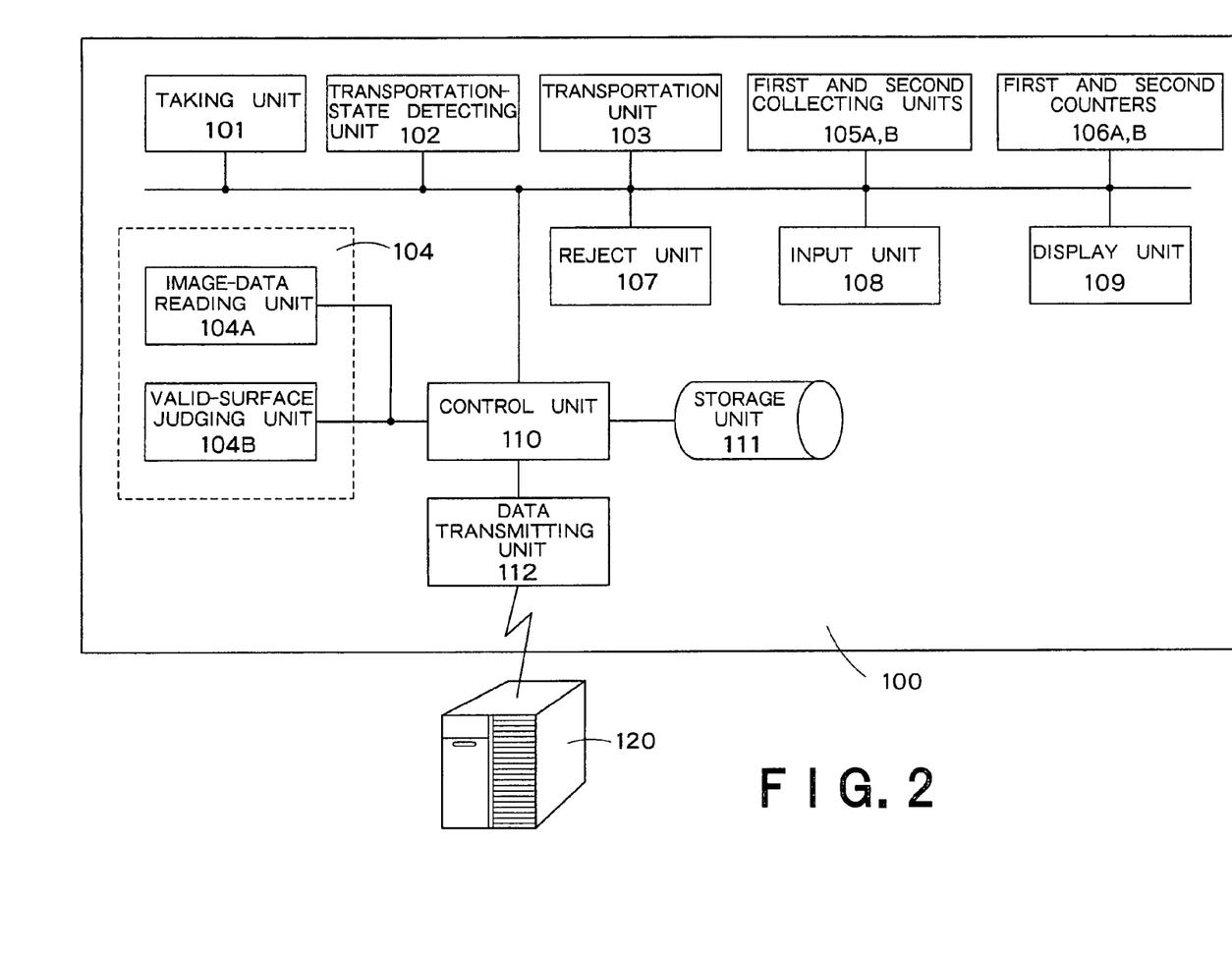
FIG. 2 is a block diagram showing the structure of the bar-code ticket processing apparatus 100 in Example 1 of the present invention.

FIG. 2 is a block diagram showing the structure of the bar-code ticket processing apparatus 100 in Example 1 of the present invention.

The bar-code ticket processing apparatus 100 in Example 1 of the present invention further includes the control unit 110, a storage unit 111, and a data transmitting unit 112, in addition to the respective units 101 to 109 shown in FIG. 1.

The control unit 110 is connected to the respective units 101 to 109, 111, and 112. The control unit 110 is configured to output control signals to the respective units 101 to 109, 111, and 112 so as to control operations thereof. Further, the control unit 110 is configured to output image data to the display unit 109, and to output, to the data transmitting unit 112, image information read by the image-information reading unit 104A and identification information read by an identification-information reading unit 104B.

The image-information reading unit 104A is configured to read image information of each bar-code ticket taken by the taking unit 101, and to output the read image information to the control unit 110. For example, the image-information reading unit 104A is a linear sensor.

The identification-information reading unit 104B is configured to read identification information of each bar-code ticket taken by the taking unit 101, and to output the read identification information to the control unit 110. When the identification-information reading unit 104B fails in reading of the identification information of the bar-code ticket, the identification-information reading unit 104B is configured to output an error signal to the control unit 110. For example, the identification-information reading unit 104B is includes at least one of a bar-code reader and an optical character reader (hereinafter referred to as "OCR").

When the identification-information reading unit 104B includes a bar-code reader, the identification-information reading unit 104B reads identification information from a bar-code printed on a bar-code ticket taken by the taking unit 101.

When the identification-information reading unit 104B includes an OCR, the identification-information reading unit 104B reads identification information of a bar-bode ticket from the image information read by the image-information reading unit 104A.

The storage unit 111 is configured to store a control program of the control unit 110, counted results of the first and second counters 106A and 106B, pattern setting information, and image data to be displayed on the display unit 109.

The data transmitting unit 112 is connected to an external device 120. The data transmitting unit 112 is configured to transmit the image information and the identification information outputted by the control unit 110 to the external device 120.

The external device 120 is connected to the bar-code ticket processing apparatus in Example 1 of the present invention. The external device 120 is configured to manage the image information and the identification information transmitted by the bar-code ticket processing apparatus 100.

Figure 3:
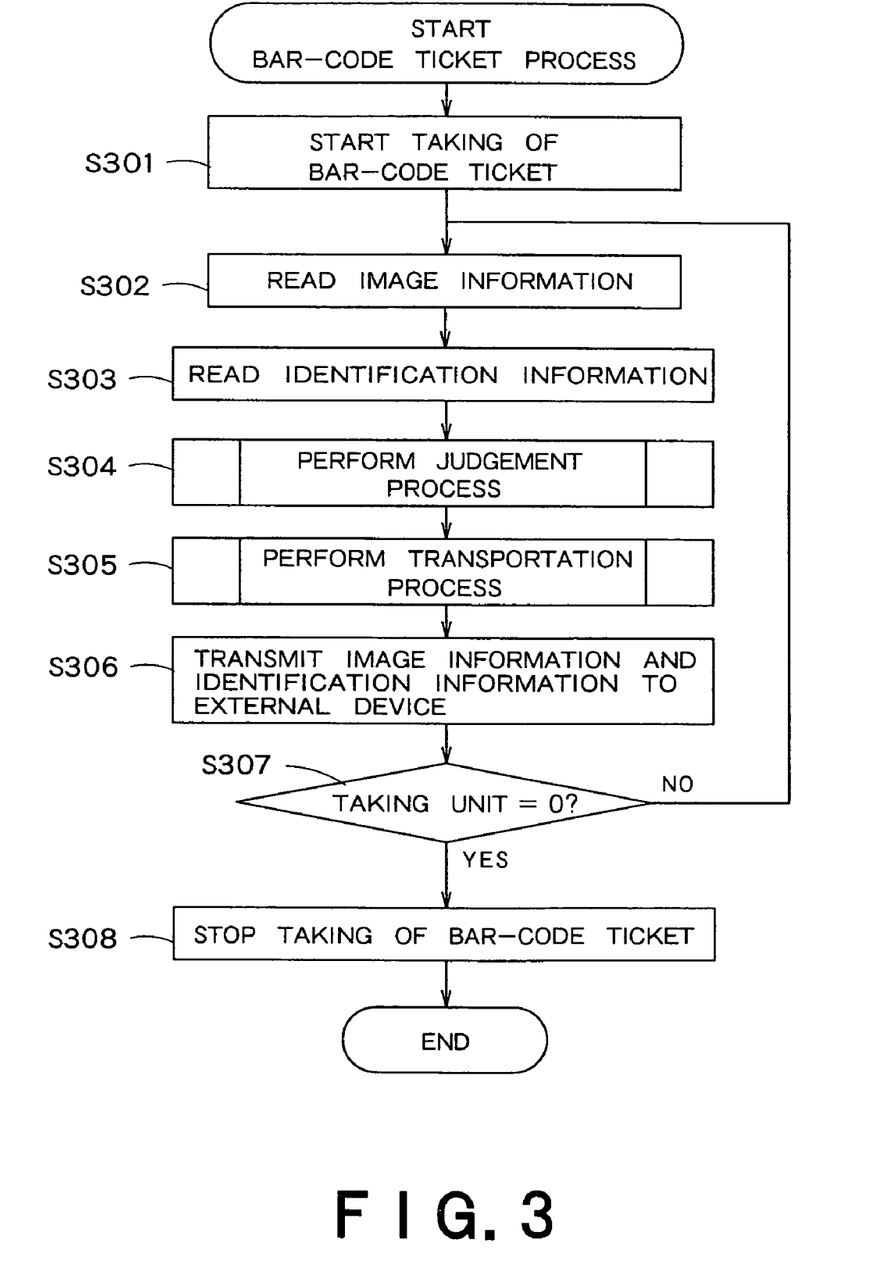
FIG. 3 is a flowchart showing a process procedure of a bar-code ticket process in Example 1 of the present invention.

FIG. 3 is a flowchart showing a process procedure of a bar-code ticket process in Example 1 of the present invention.

The bar-code ticket process in Example 1 of the present invention is carried out by the respective units 101 to 109, 111, and 112 of the bar-code ticket processing apparatus 100, which are operated based on control signals outputted by the control unit 110.

At first, the taking unit 101 starts a taking operation of a batch (bundle) of bar-code tickets placed thereon (S301).

Then, the image-information reading unit 104A reads image information of the bar-code ticket taken by the taking unit 101, and outputs the read image information to the control unit 110 (S302).

Then, the identification-information reading unit 104B reads identification information of the bar-code ticket taken by the taking unit 101, and outputs the read identification information to the control unit 110 (S303). At this time, when the identification-information reading unit 104B fails in reading of the identification information, the identification-information reading unit 104B outputs an error signal to the control unit 110.

Then, the control unit 110 performs a judgment process described below (S304).

Then, the transportation unit 103 performs a transportation process described below (S305).

Then, the data transmitting unit 112 transmits the image information and the identification information outputted by the control unit 110, to the external device 120 (S306).

The steps S302 to S306 are repeated until all the bar-code tickets placed on the taking unit 101 are taken by the taking unit 101 (S307-NO). When there remains no bar-code ticket on the taking unit 101 (S307-YES), the taking unit 101 stops the taking operation which was started in the step S301 (5308).

The bar-code ticket process in Example 1 of the present invention is terminated after the step S308.

Figure 4:
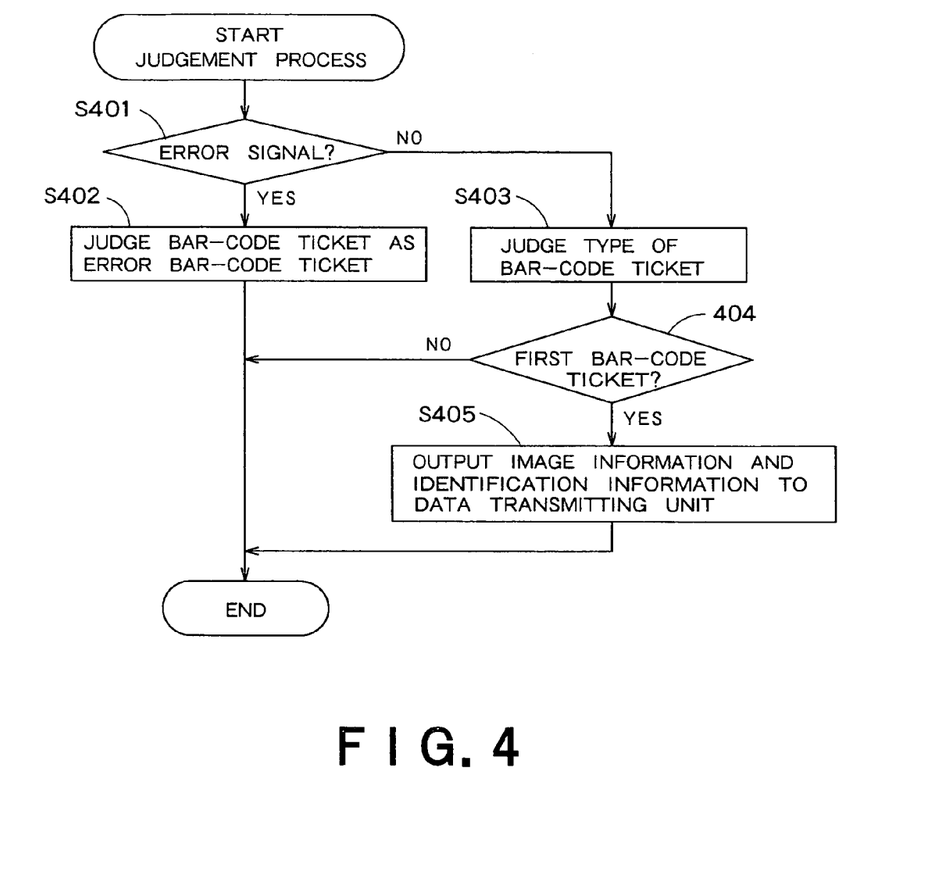
FIG. 4 is a flowchart showing a process procedure of a judgment process (S304 of FIG. 3)

FIG. 4 is a flowchart showing a process procedure of the judgment process (S304 of FIG. 3).

The judgment process (5304 of FIG. 3) is carried out by the respective units 101 to 109, 111, and 112 of the bar-code ticket processing apparatus 100, which are operated based on control signals outputted by the control unit 110.

At first, when an error signal is outputted by the identification-information reading unit 104B in the step S303 of FIG. 3 (S401-YES), the control unit 110 judges the bar-code ticket taken by the taking unit 101 as an error bar-code ticket (S402).

On the other hand, when identification information is outputted by the identification-information reading unit 104B in the step S303 of FIG. 3 (S401-NO), the control unit 110 judges the type of the bar-code ticket taken by the taking unit 101 (S403), based on the identification information (e.g., the digit number of the validation number). The judged bar-code tickets are classified into a first bar-code ticket (e.g., TITO (Ticket In Ticket Out) ticket) whose image information and identification information should be transmitted to the external device 120, or a second bar-code ticket (e.g., coupon ticket) whose image information and identification information may not be transmitted to the external device 120.

Then, when the bar-code ticket is judged as the first bar-code ticket in the step S403 (S404-YES), the control unit 110 outputs, to the data transmitting unit 112, the image information outputted by the image-information reading unit 104A in the step S302 of FIG. 3, and the identification information outputted by the identification-information reading unit 104B in the step S303 of FIG. 3 (S405).

The judgment process (S304 of FIG. 3) is terminated when the bar-code ticket is judged as the second bar-code ticket after the step S402 or S405 or in the step S403 (S404-NO).

Figure 5:
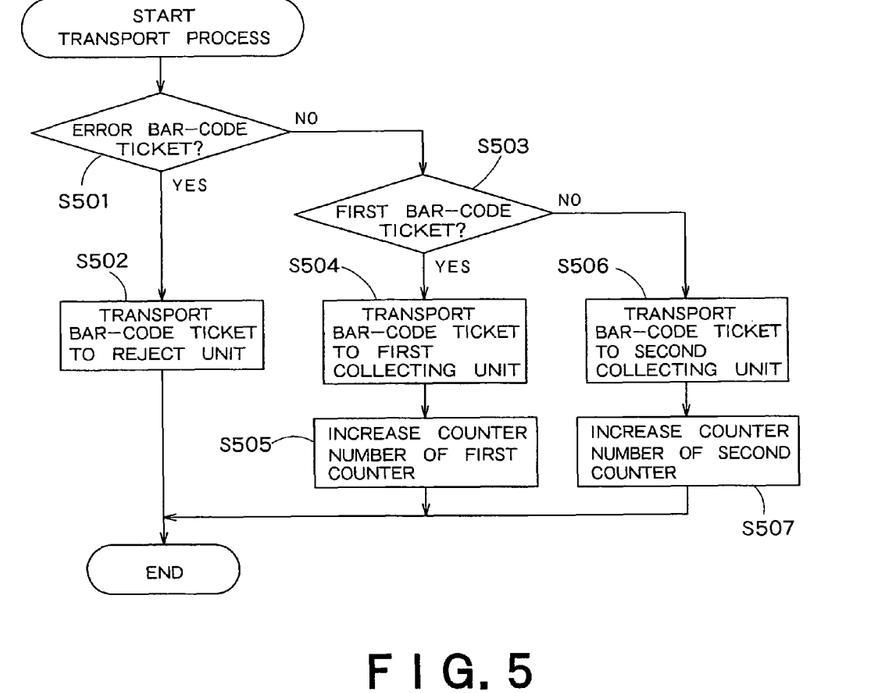
FIG. 5 is a flowchart showing a process procedure of a transportation process (S305 of FIG. 3)

FIG. 5 is a flowchart showing a process procedure of the transportation process (S305 of FIG. 3).

The transportation process (S305 of FIG. 3) is carried out by the respective units 101 to 109, 111, and 112 of the bar-code ticket processing apparatus 100, which are operated based on control signals outputted by the control unit 110.

At first, when an error signal is outputted in the step S401 of FIG. 4 (S401-NO) and the bar-code ticket is judged as the error bar-code ticket in the step S402 (S501-YES), the transportation unit 103 transports the bar-code ticket taken by the taking unit 101 to the reject unit 107 (S502).

On the other hand, when no error signal is outputted in the step S401 of FIG. 4 (S401-YES) and the bar-code ticket is not judged as the error bar-code ticket in the step S402 (S501-NO) but is judged as the first bar-code ticket (S503-YES), the transportation unit 103 transports the bar-code ticket taken by the taking unit 101 to the first collecting unit 105A (S504). Then, the control unit 110 increases the count number of the first counter 106A (S505).

On the other hand, when no error signal is outputted in the step S401 of FIG. 4 (S401-YES) and the bar-code ticket is not judged as the error bar-code ticket in the step S402 (S501-NO) but is judged as the second bar-code ticket (S503-NO), the transportation unit 103 transports the bar-code ticket taken by the taking unit 101 to the second collecting unit 105B (S506). Then, the control unit 110 increases the count number of the second counter 106B (S507).

The transportation process (S305 of FIG. 3) is terminated after the step S502, S505, or S507.

In the transportation process (S305 of FIG. 3) in Example 1 of the present invention, the bar-code tickets are transported to the first and the second collecting units 105A and 105B depending on the types of the bar-code tickets. However, when the first collecting unit 105A becomes full, the bar-code tickets may be transported to the second collecting unit 105B.

Figure 6:
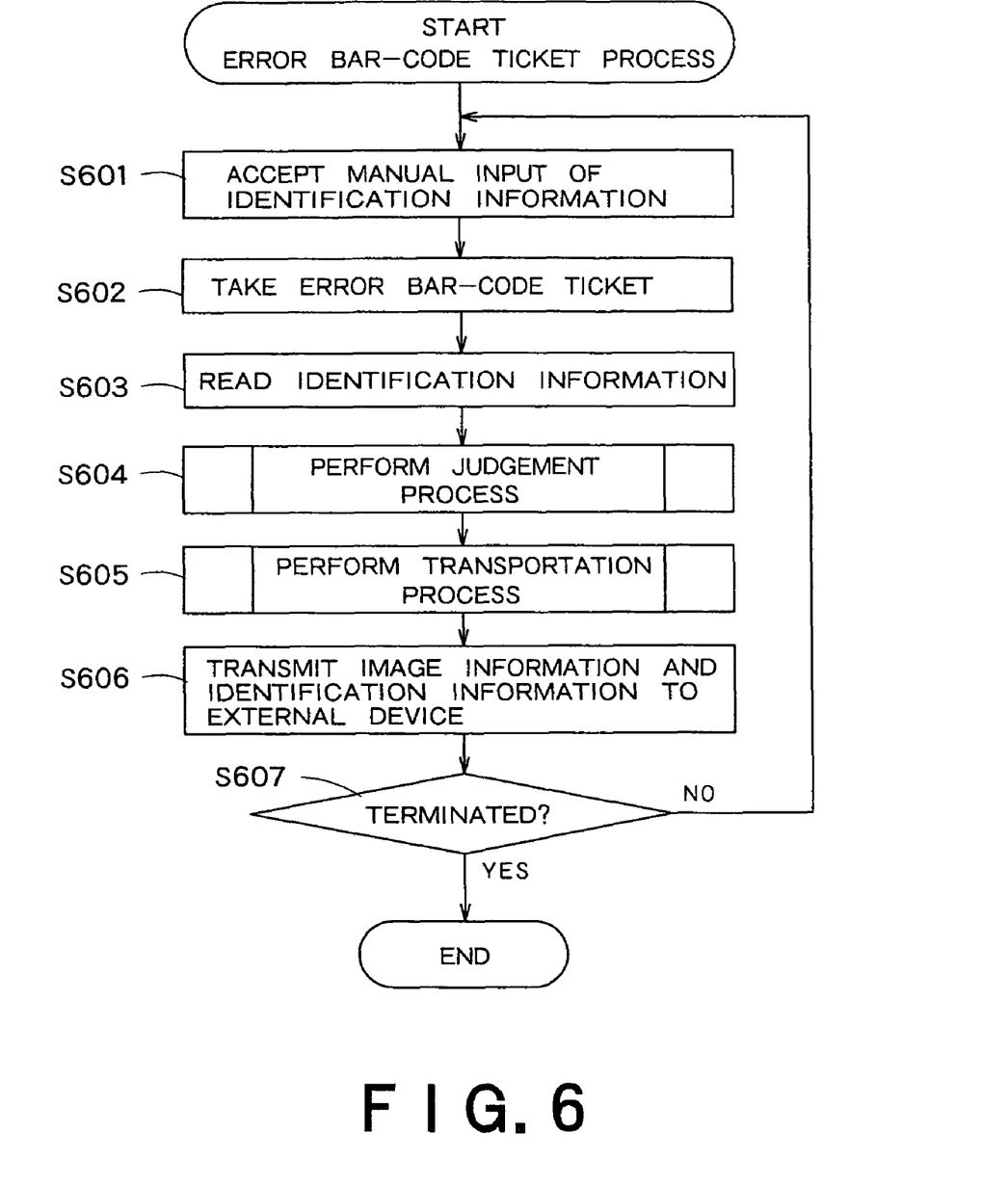
FIG. 6 is a flowchart showing a process procedure of an error bar-code ticket process in Example 1 of the present invention.

FIG. 6 is a flowchart showing a process procedure of the error bar-code ticket process in Example 1 of the present invention.

When an input command for starting the error bar-code ticket process mode is received by the input unit 108, the error bar-code ticket process in Example 1 of the present invention is carried out by the respective units 101 to 109, 111, and 112 of the bar-code ticket processing apparatus 100, which are operated based on control signals outputted by the control unit 110.

At first, the input unit 108 receives a manual input of the identification information of the error bar-code ticket, and outputs the information to the control unit 110 (S601). The manual input is performed by an operator who looks at the error bar-code ticket. To be specific, the operator picks up the error bar-code ticket which has been transported to the reject unit 107 in the step S502 of FIG. 5, and looks at the numerical characters (validation number) printed near to the bar-code. Then, the operator inputs the validation number by pressing down a numeric pad of the input unit 108. At this time, the control unit 110 outputs the identification information outputted by the input unit 108 to the data transmitting unit 112.

Then, the taking unit 101 takes the error bar-code tickets placed thereon (S602). After the step S601, the error bar-code tickets are placed one by one on the taking unit 101 by the operator, from the batch of the error bar-code tickets which have been transported to the reject unit 107 in the step S502 of FIG. 5

Then, the image-information reading unit 104A reads the image information of the error bar-code ticket taken in the step S602, and outputs the read image information to the control unit 110 (S603). At this time, the control unit 110 outputs the image information outputted by the image-information reading unit 104A to the data transmitting unit 112.

Then, the control unit 110 performs the judgment process shown in FIG. 4 (S604). At this time, the control unit 110 judges the types of the bar-code tickets according to the identification information received in the step S601 (S403 of FIG. 4)

Then, the transportation unit 103 performs the transportation process shown in FIG. 5 (S605).

Then, the data transmitting unit 112 transmits the image information and the identification information, which have been outputted by the control unit 110 in the steps S601 and S603, to the external device 120 (S606).

The steps S601 to S606 are repeated until an input command for terminating the error bar-code ticket process mode is received by the input unit 108 (S607-NO). When such an input command is received (S607-YES), the error bar-code ticket process in Example 1 of the present invention is terminated.

In Example 1 of the present invention, although two types of the first bar-code ticket and the second bar-code ticket are processed, only the first bar-code ticket may be processed. In this case, the first collecting unit 105A and the second collecting unit 105B may be alternately switched, every when the collecting unit 105A or 105B becomes full or every when the collecting unit 105A or 105B receives the predetermined number of tickets.

According to Example 1 of the present invention, the image information and the identification information of the bar-code ticket whose identification information has been successfully read in the bar-code ticket process, are transmitted to the external device 120, and the image information and the identification information of the error bar-code tickets are transmitted to the external device 120 in the error bar-code ticket process. Thus, the burden of an operation of manually inputting the identification information of the error bar-code ticket by using the external device 120 can be reduced, and both the image information and the identification information of the error bar-code ticket can be transmitted to the external device 120.

Example 2

Next, Example 2 of the present invention will be described. In Example 1 of the present invention, in the error bar-code ticket process that is performed after the termination of the bar-code ticket process, the image information of the error bar-code ticket is read, and a manual input of the identification information thereof is received. On the other hand, in Example 2 of the present invention, when the bar-code ticket is judged as an error bar-code ticket in the bar-code ticket process, the taking operation is interrupted and a manual input of identification information of the error bar-code ticket is received. Part of description of Example 2 that is repeating that of Example 1 is omitted.

Figure 7:
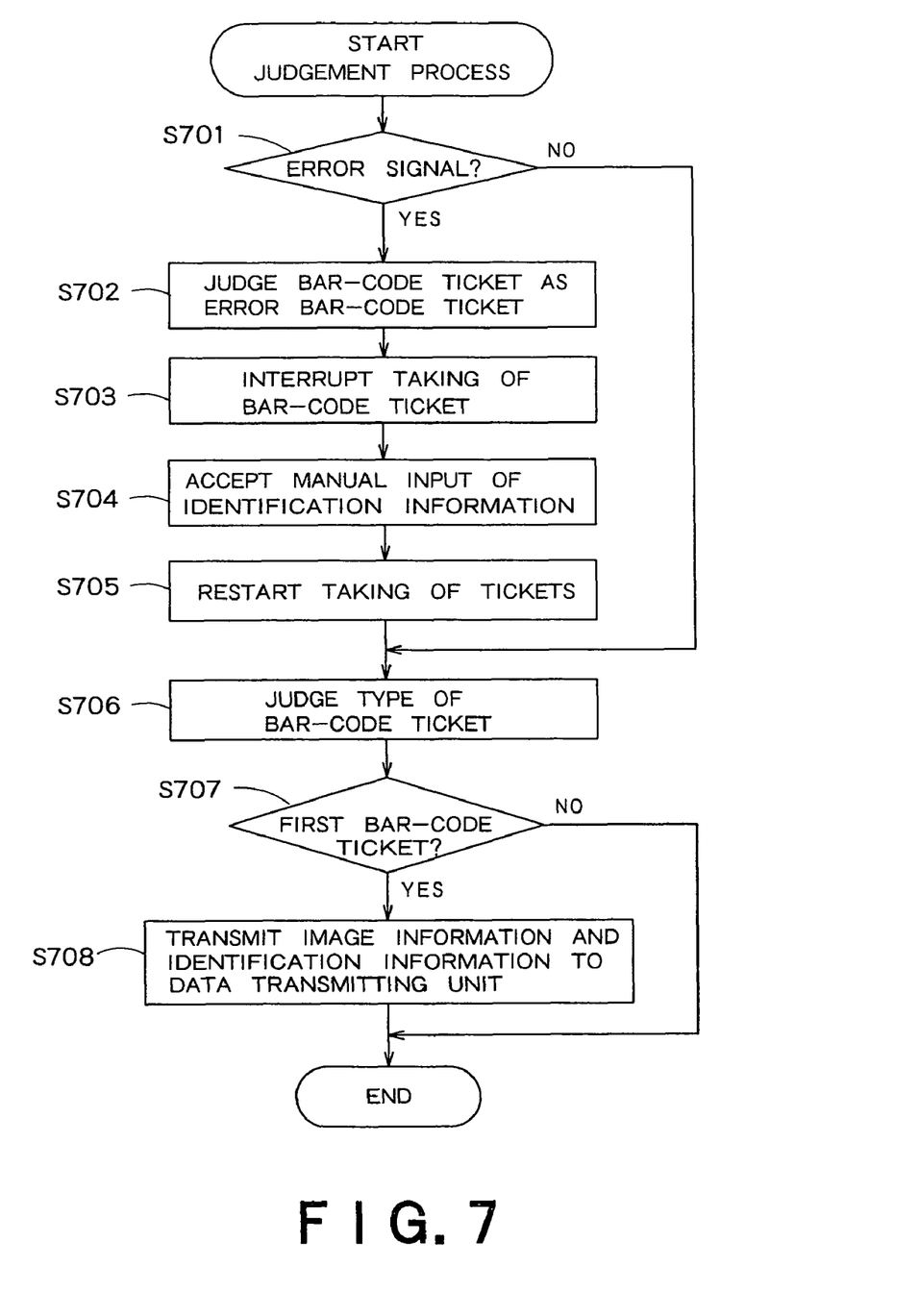
FIG. 7 is a flowchart showing a process procedure of a judgment process (S304 of FIG. 3) in Example 2 of the present invention.

FIG. 7 is a flowchart showing a process procedure of the judgment process (S304 of FIG. 3) in Example 2 of the present invention.

The judgment process (S304 of FIG. 3) in Example 2 of the present invention is carried out by the respective units 101 to 109, 111, and 112 of the bar-code ticket processing apparatus 100, which are operated based on control signals outputted by the control unit 110.

At first, when an error signal is outputted by the identification information reading unit 104B in the step S303 of FIG. 3 (S701-YES), the control unit 110 judges the bar-code ticket taken by the taking unit 101 as an error bar-code ticket (S702).

Then, the taking unit 101 interrupts the taking operation of the bar-code tickets (S703).

Then, the input unit 108 receives a manual input of the identification information of the error bar-code ticket, and outputs the information to the control unit 110 (S704). The manual input is performed by an operator who looks at the error bar-code ticket.

Then, the taking unit 101 restarts the taking operation of the bar-code tickets (S705).

Then, the control unit 110 judges the type of the bar-code ticket taken by the taking unit 101 (S706), based on the identification information (e.g., the digit number of the validation number) outputted by the input unit 108 in the step S704. The judged bar-code tickets are classified into a first bar-code ticket (e.g., TITO (Ticket In Ticket Out) ticket) whose image information and identification information should be transmitted to the external device 120, or a second bar-code ticket (e.g., coupon ticket) whose image information and identification information may not be transmitted to the external device 120.

When the bar-code ticket is judged as the first bar-code ticket in the step S706 (S707-YES), the control unit 110 outputs, to the data transmitting unit 112, the image information outputted by the image-information reading unit 104A in the step S302 of FIG. 3 and the identification information outputted by the input unit 108 in the step S704 (S708).

The judgment process (S304 of FIG. 3) in Example 2 of the present invention is terminated when the bar-code ticket is judged as the second bar-code ticket after the step S708 or in the step S706 (S707-NO).

Figure 8:
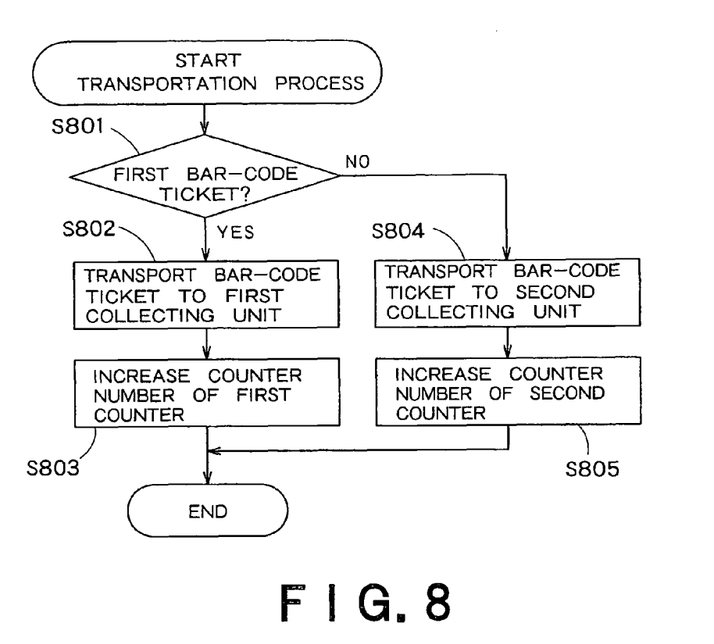
FIG. 8 is a flowchart showing a process procedure of a transportation process (S305 of FIG. 3) in Example 2 of the present invention.

FIG. 8 is a flowchart showing a process procedure of the transportation process (S305 of FIG. 3) in Example 2 of the present invention.

The transportation process (S305 of FIG. 3) in Example 2 of the present invention is carried out by the respective units

101 to 109, 111, and 112 of the bar-code ticket processing apparatus 100, which are operated based on control signals outputted by the control unit 110.

At first, when the bar-code ticket is judged as the first bar-code ticket in the step S706 of FIG. 7 (S801-YES), the transportation unit 103 transports the bar-code ticket taken by the taking unit 101 to the first collecting unit 105A (S802). Then, the control unit 110 increases the count number of the first counter 106A (S803).

On the other hand, when the bar-code ticket is judged as the second bar-code ticket in the step S706 of FIG. 7 (S801-NO), the transportation unit 103 transports the bar-code ticket taken by the taking unit 101 to the second collecting unit 105B (S804). Then, the control unit 110 increases the count number of the second counter 106B (S805).

The transportation process (S305 of FIG. 3) in Example 2 of the present invention is terminated after the step S803 or S805.

In Example 2 of the present invention, although two types of the first bar-code ticket and the second bar-code ticket are processed in the transportation process (S305 of FIG. 3), only the first bar-code ticket may be processed. In this case, the first collecting unit 105A and the second collecting unit 105B may be alternately switched, every when the collecting unit 105A or 105B becomes full or every when the collecting unit 105A or 105B receives the predetermined number of tickets.

According to Example 2 of the present invention, when the bar-code ticket is judged as the error bar-code ticket in the bar-code ticket process, the taking operation of the bar-code tickets is interrupted, and a manual input of the identification information of the error bar-code ticket is received by the input unit 108. Thus, the burden of an operation of manually inputting the identification information of the error bar-code ticket by using the external device 120 can be reduced, and both the image information and the identification information of the error bar-code ticket can be transmitted to the external device 120.

Example 3

Next, Example 3 of the present invention will be described. In Example 1 of the present invention, in the error bar-code ticket process that is performed after the termination of the bar-code ticket process, the image information of the error bar-code ticket is read, and a manual input of the identification information thereof is received. On the other hand, in Example 3 of the present invention, the image information is displayed in the error bar-code ticket process, and a manual input of the identification information thereof is received. Part of description of Example 3 that is repeating those of Examples 1 and 2 is omitted.

Figure 9:
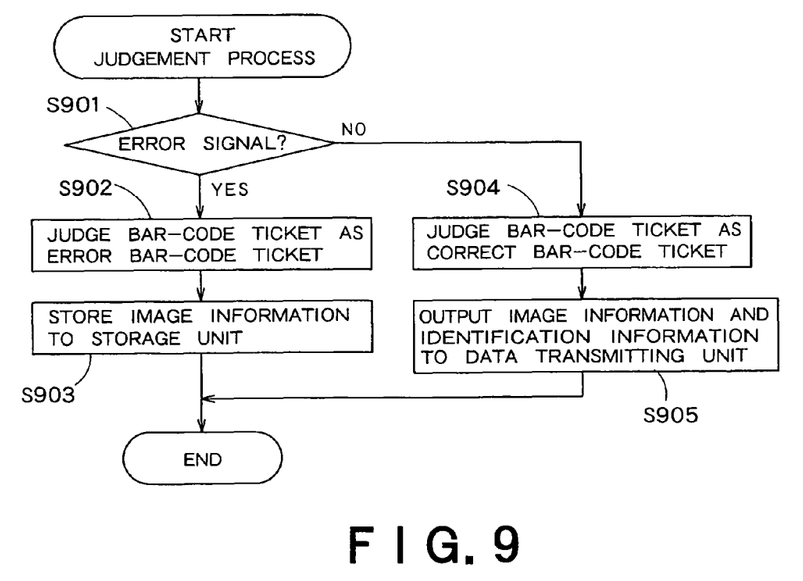
FIG. 9 is a flowchart showing a process procedure of a judgment process (S304 of FIG. 3) in Example 3 of the present invention.

FIG. 9 is a flowchart showing a process procedure of the judgment process (S304 of FIG. 3) in Example 3 of the present invention.

The judgment process (S304 of FIG. 3) in Example 3 of the present invention is carried out by the respective units 101 to 109, 111, and 112 of the bar-code ticket processing apparatus 100, which are operated based on control signals outputted by the control unit 110.

At first, when an error signal is outputted by the identification-information reading unit 104B in the step S303 of FIG. 3 (S901-YES), the control unit 110 judges the bar-code ticket taken by the taking unit 101 as the error bar-code ticket (S902).

Then, the control unit 110 stores the image information, which has been outputted by the image-information reading unit 104A in the step S302 of FIG. 3, to the storage unit 111 (S903).

On the other hand, when identification information is outputted by the identification-information reading unit 104B in the step S303 of FIG. 3 (S901-NO), the control unit 110 judges the bar-code ticket taken by the taking unit 1010 as a correct bar-code ticket (S904).

Then, the control unit 110 outputs, to the data transmitting unit 112, the image information read by the image-information reading unit 104A in the step S302 of FIG. 3 and the identification information read by the identification-information reading unit 104B in the step S303 of FIG. 3 (S905).

Figure 10:
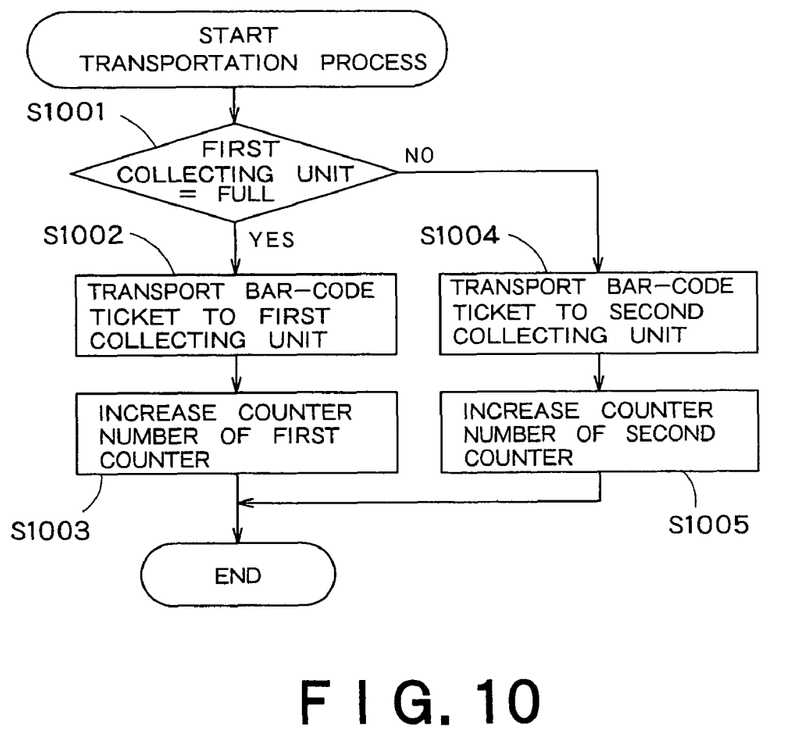
FIG. 10 is a flowchart showing a process procedure of a transportation process (S305 of FIG. 3) in Example 3 of the present invention.

FIG. 10 is a flowchart showing a process procedure of the transportation process (S305 of FIG. 3) in Example 3 of the present invention.

The transportation process (S305 of FIG. 3) in Example 3 of the present invention is carried out by the respective units 101 to 109, 111, and 112 of the bar-code ticket processing apparatus 100, which are operated based on control signals outputted by the control unit 110.

At first, the transportation unit 103 transports the bar-code tickets (error bar-code tickets and correct bar-code tickets) to the first collecting unit 105A until the first collecting unit 105A becomes full (S1001-NO, S1002). Then, the control unit 110 increases the count number of the first counter 106A (S1003).

On the other hand, when the first collecting unit 105A has been already full (S1001-YES), the bar-code tickets (error bar-code tickets and correct bar-code tickets) are transported to the second collecting unit 105B (S1004). Then, the control unit 110 increases the count number of the second counter 106B (S1005).

The transportation process (S305 of FIG. 3) in Example 3 of the present invention is terminated after the step S1003 or S1005.

Figure 11:
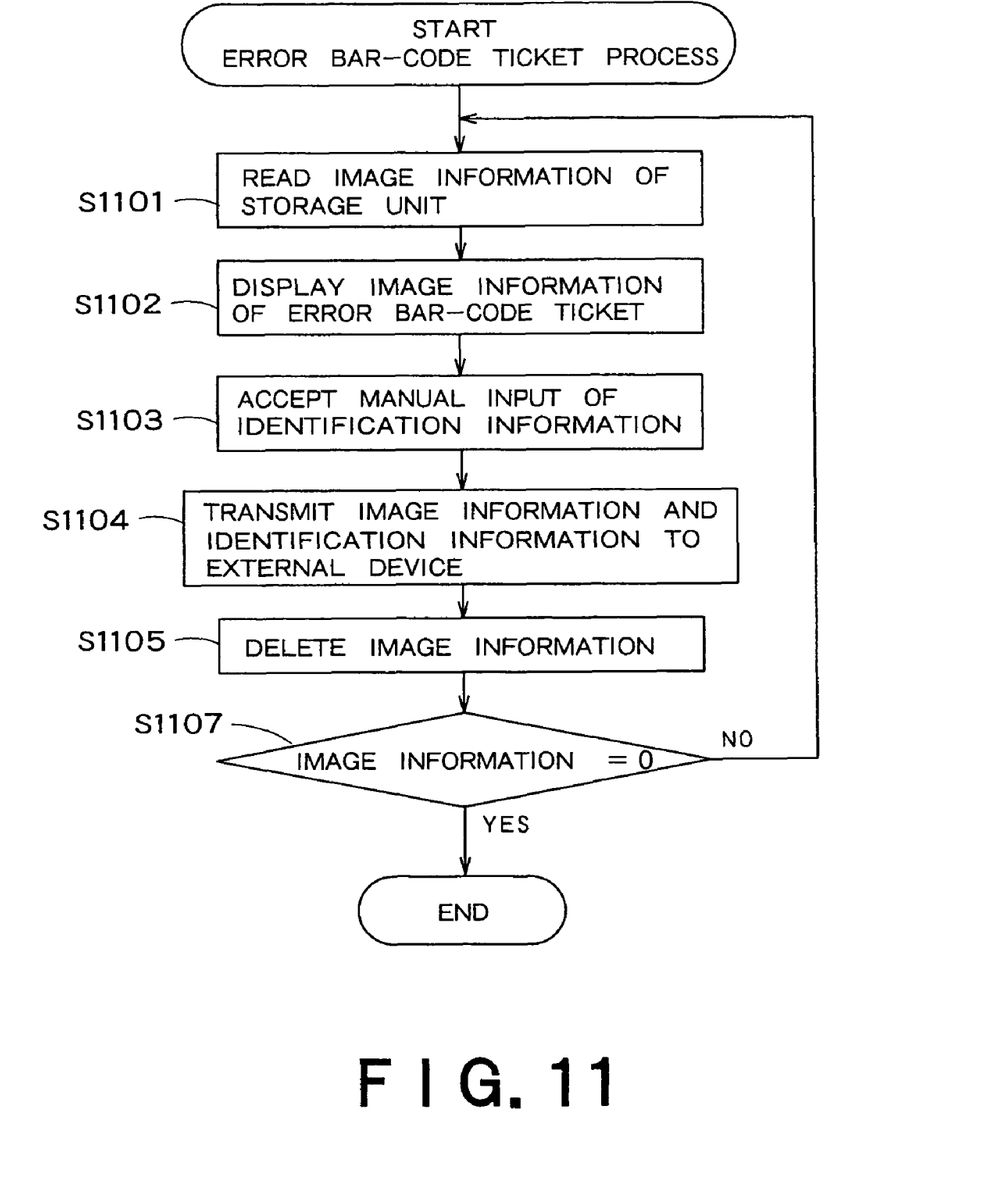
FIG. 11 is a flowchart showing a process procedure of an error bar-code ticket process in Example 3 of the present invention.

FIG. 11 is a flowchart showing a process procedure of the error bar-code ticket process in Example 3 of the present invention.

When a manual input command for starting the error bar-code ticket process mode is received by the input unit 108, the error bar-code ticket process in Example 3 of the present invention is carried out by the respective units 101 to 109, 111, and 112 of the bar-code ticket processing apparatus 100, which are operated based on control signals outputted by the control unit 110.

At first, the control unit 110 reads the image information stored in the storage unit 111 in the step S903 of FIG. 9 (S1101).

Then, the display unit 109 displays the image information outputted by the control unit 110 in the step S1101 (S1102).

Then, the input unit 108 receives a manual input of the identification information of the error bar-code ticket, and outputs the information to the control unit 110 (S1103). The manual input is performed by an operator who looks at the error bar-code ticket. To be specific, the operator looks at the numerical characters (validation number) printed near to the bar-code, with the aid of a zoom-display process or the like. Then, the operator inputs the validation number by pressing down a numeric pad of the input unit 108. At this time, the control unit 110 outputs the identification information outputted by the input unit 108 to the data transmitting unit 112.

Then, the data transmitting unit 120 transmits the image information and the identification information outputted by the control unit 110, to the external device 120 (S1104).

Then, the control unit 110 deletes the image information transmitted to the external device 120 in the step S1104, from the storage unit 111 (S1105).

The steps S1101 to S1105 are repeated until there remains no image information stored in the storage unit 111 (S1106-NO). When there remains no image information stored in the storage unit 111 (S1106-YES), the error bar-code process in Example 3 of the present invention is terminated.

In Example 3 of the present invention, although two types of the first bar-code ticket and the second bar-code ticket are processed, only the first bar-code ticket may be processed. In this case, the first collecting unit 105A and the second collecting unit 105B may be alternately switched, every when the collecting unit 105A or 105B becomes full or every when the collecting unit 105A or 105B receives the predetermined number of tickets.

According to Example 3 of the present invention, the image information is displayed and a manual input of the identification information is received in the error bar-code ticket process. Thus, the burden of an operation of manually inputting the identification information of the error bar-code ticket by using the external device 120 can be reduced, and both the image information and the identification information of the error bar-code ticket can be transmitted to the external device 120.

The invention claimed is:

1. A bar-code ticket processing apparatus to be connected to an external device, the bar-code ticket processing apparatus comprising:
   a taking unit configured to take thereinto a bar-code ticket;
   an image-information reading unit configured to read image information of the bar-code ticket taken by the taking unit;
   an identification-information reading unit configured to read identification information of the bar-code ticket taken by the taking unit;
   a control unit configured to judge, when the identification-information reading unit fails in reading of the identification information of the bar-code ticket, the bar-code ticket as an error bar-code ticket;
   an input unit configured to receive a manual input of the identification information of the bar-code ticket judged as the error bar-code ticket by the control unit; and
   a data transmitting unit configured to associate the image information read by the image-information reading unit with the identification information read by the identification-information reading unit when the identification-information reading unit has read the identification information of the bar-code ticket and to transmit the associated information to the external device, and to associate the image information read by the image-information reading unit with the identification information received by the input unit when the identification-information reading unit has failed to read the identification information of the bar-code ticket and the identification information has been received by the input unit and to transmit the associated information to the external device.

2. The bar-code ticket processing apparatus according to claim 1, wherein:
   the identification-information reading unit includes a bar-code reader configured to read a bar-code of the bar-code ticket taken by the taking unit; and
   when the bar-code reader fails in reading of the bar-code of the bar-code ticket, the control unit is configured to judge the bar-code ticket as the error bar-code ticket.

3. The bar-code ticket processing apparatus according to claim 1, wherein:
   the identification-information reading unit includes an OCR configured to read characteristic information printed on the bar-code ticket from the image information of the bar-code ticket read by the image-information reading unit; and
   when the OCR fails in reading of the characteristic information printed on the bar-code ticket, the control unit is configured to judge the bar-code ticket as the error bar-code ticket.

4. The bar-code ticket processing apparatus according to claim 3, wherein
   when the OCR fails in reading of a validation number corresponding to the bar-code, the control unit is configured to judge the bar-code ticket as the error bar-code ticket.

5. The bar-code ticket processing apparatus according to claim 3, wherein
   when the OCR fails in reading of a sum of money or a shop name printed on the bar-code ticket, the control unit is configured to judge the bar-code ticket as the error bar-code ticket.

6. The bar-code ticket processing apparatus according to claim 1, further comprising:
   a transportation unit configured to transport, when the bar-code ticket is judged as the error bar-code ticket by the control unit, the error bar-code ticket to a reject unit.

7. The bar-code ticket processing apparatus according to claim 1, wherein:
   the taking unit is configured to take thereinto error bar-code tickets one by one; and
   when the image information of the error bar-code ticket read by the image-information reading unit and the identification information of the error bar-code ticket received by the input unit are transmitted by the data transmitting unit to the external device, the taking unit is configured to take a next error bar-code ticket.

8. The bar-code ticket processing apparatus according to claim 1, wherein
   when the bar-code ticket is judged as the error bar-code ticket by the control unit, the taking unit is configured to interrupt the taking operation.

9. The bar-code ticket processing apparatus according to claim 8, wherein:
   the input unit is configured to receive a manual input of the identification information of the error bar-code ticket, after the taking operation has been interrupted; and
   when the identification information of the error bar-code ticket is received by the input unit, the taking unit restarts the taking operation.

10. The bar-code ticket processing apparatus according to claim 1, further comprising:
    a display unit configured to display the image information of the bar-code ticket judged as the error bar-code ticket by the control unit.

11. A method of controlling a bar-code ticket processing apparatus to be connected to an external device, the method comprising:
    taking a bar-code ticket;
    reading image information of the bar-code ticket taken in the taking of the bar-code ticket;
    reading identification information of the bar-code ticket taken in the taking of the bar-code;

judging, when the reading of the identification information of the bar-code ticket fails in the reading of the identification information, the bar-code ticket as an error bar-code ticket;

receiving a manual input of the identification information of the bar-code ticket judged as the error bar-code ticket in the judging of the bar-code ticket; and associating the image information read by the image-information reading unit with the identification information read by the identification-information reading unit when the identification-information reading unit has read the identification information of the bar-code ticket and transmitting the associated information to the external device, or associating the image information read by the image-information reading unit with the identification information received by the input unit when the identification-information reading unit has failed to read the identification information of the bar-code ticket and the identification information has been received by the input unit and transmitting the associated information to the external device.

12. The method of controlling a bar-code ticket processing apparatus according to claim 11, wherein:

in the reading of the identification information, a bar-code of the bar-code ticket taken in the taking of the bar-code is read; and in the judging of the bar-code ticket, when the reading of the bar-code of the bar-code ticket fails in the reading of the identification information, the bar-code ticket is judged as the error bar-code ticket.

13. The method of controlling a bar-code ticket processing apparatus according to claim 11, wherein:

in the reading of the identification information, characteristic information printed on the bar-code ticket is read from the image information of the bar-code ticket read in the reading of the image information; and in the judging of the bar-code ticket, when the reading of the characteristic information printed on the bar-code ticket fails in the reading of the identification information, the bar-code ticket is judged as the error bar-code ticket.

14. The method of controlling a bar-code ticket processing apparatus according to claim 13, wherein in the judging of the bar-code ticket, when the reading of a validation number corresponding to the bar-code fails in the reading of the identification information, the bar-code ticket is judged as the error bar-code ticket.

15. The method of controlling a bar-code ticket processing apparatus according to claim 13, wherein in the judging of the bar-code ticket, when the reading of a sum of money or a shop name printed on the bar-code ticket fails in the reading of the identification information, the bar-code ticket is judged as the error bar-code ticket.

16. The method of controlling a bar-code ticket processing apparatus according to claim 11, further comprising:

transporting, when the bar-code ticket is judged as the error bar-code ticket in the judging of the bar-code ticket, the error bar-code ticket to a reject unit.

17. The method of controlling a bar-code ticket processing apparatus according to claim 11, wherein:

in the taking of the bar-code ticket, error bar-code tickets are taken one by one; and when the image information of the error bar-code ticket read in the reading of the image information and the identification information of the error bar-code ticket received by the input unit are transported to the external device in the transmitting of the data, a next error bar-code ticket is taken in the taking of the bar-code ticket.

18. The method of controlling a bar-code ticket processing apparatus according to claim 11, wherein in the taking of the bar-code ticket, when the bar-code ticket is judged as the error bar-code ticket in the judging of the bar-code ticket, the taking operation is interrupted.

19. The method of controlling a bar-code ticket processing apparatus according to claim 18, wherein:

in the receiving of the manual input, a manual input of the identification information of the error bar-code ticket is received after the taking operation has been interrupted; and in the taking of the bar-code ticket, when the identification information of the error bar-code ticket is received in the inputting of the identification information, the taking operation is restarted.

20. The method of controlling a bar-code ticket processing apparatus according to claim 11, further comprising:

displaying the image information of the bar-code ticket judged as the error bar-code ticket in the judging of the bar-code ticket.

\* \* \* \* \*